(12) United States Patent
Dang

(10) Patent No.: US 6,249,493 B1
(45) Date of Patent: *Jun. 19, 2001

(54) RECORDING OR REPLAY DEVICE AND METHOD FOR RECOGNITION OF A FOCUSSING STATUS

(75) Inventor: Lieu Kim Dang, Villingen-Schwenningen (DE)

(73) Assignee: Deutsche Thomson-Brandt GmbH, Villingen-Schwenningen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/946,987

(22) Filed: Oct. 8, 1997

(30) Foreign Application Priority Data

Nov. 1, 1996 (DE) ................................ 196 45 110

(51) Int. Cl.$^7$ ............................................ G11B 7/00
(52) U.S. Cl. ................... 369/44.23; 369/112.28
(58) Field of Search ............... 369/44.23, 112, 369/110, 109

(56) References Cited

U.S. PATENT DOCUMENTS

| | | | |
|---|---|---|---|
| 4,525,625 | * | 6/1985 | Abe ................................... 369/44.23 |
| 4,771,414 | * | 9/1988 | Yoshimatsu ......................... 369/110 |
| 4,805,992 | | 2/1989 | Maeda . |

(List continued on next page.)

FOREIGN PATENT DOCUMENTS

| | | |
|---|---|---|
| 33 34 120 C2 | 3/1984 | (DE) . |
| 36 04 722 A1 | 9/1986 | (DE) . |
| 36 35 143 C2 | 4/1987 | (DE) . |
| 37 15 443 A1 | 11/1987 | (DE) . |

(List continued on next page.)

OTHER PUBLICATIONS

* Patent Abstracts of Japan, vol. 013, No. 185 (P–865), May 2, 1989 (Seiko Epson Corp.).
** Patent Abstracts of Japan, vol. 014, No. 333 (P–1078), Jul. 18, 1990 (Ricoh Co. Ltd.).
*** Patent Abstracts of Japan, vol. 014, No. 561 (P–1142), Dec. 13, 1990 (Ricoh Co. Ltd.).
* Patent Abstracts of Japan, vol. 014, No. 195 (P–1039), Apr. 20, 1990 (Mitsubishi Electric Corp).
** Patent Abstracts of Japan, vol. 096, No. 004, Apr. 30, 1996, (Olympus Optical Co., Ltd.).
*** Patent Abstracts of Japan, vol. 095, No. 010, Nov. 30, 1995 (Sony Corp.).
* Patent Abstracts of Japan, vol. 013, No. 087 (P–835), Feb. 28, 1989 (Pioneer Electronic Corp.).
** Patent Abstracts of Japan, vol. 018, No. 315 (P–1755) Jun. 15, 1994 (Sony Corp.).
*** Patent Abstracts of Japan, vol. 018, No. 564 (P–1819), Oct. 27, 1994 (NEC Corp.).

Primary Examiner—Thang V. Tran
(74) Attorney, Agent, or Firm—Joseph S. Tripoli; Paul P. Kiel (57) ABSTRACT

The present invention relates to a recording or replay device, and to a method for recognizing a focussing status. The object of the invention is to provide a method of this type and a recording or replay device, with the facility of producing significant astigmatism in the reflected light beam (15) simply and cost-efficiently without elaborate alignment. This object is achieved by the use of a birefringent element (23, 24). The invention is, in particular, suitable for use in a recording or replay device for writing to or playing back optical recording media (11) such as CDs, video discs, DVDs and the like.

6 Claims, 5 Drawing Sheets

U.S. PATENT DOCUMENTS

| | | | |
|---|---|---|---|
| 4,951,274 | * | 8/1990 | Iwanaga et al. ..................... 369/110 |
| 5,189,651 | * | 2/1993 | Utsumi .................................. 369/13 |
| 5,243,583 | | 9/1993 | Ohuchida et al. . |
| 5,272,685 | | 12/1993 | Ando . |
| 5,337,299 | | 8/1994 | Takahashi . |
| 5,428,596 | * | 6/1995 | Hineno et al. ....................... 369/112 |
| 5,508,992 | | 4/1996 | Hirose et al. ........................ 369/109 |
| 5,550,798 | * | 8/1996 | Hineno elt la. .................... 369/44.23 |
| 5,636,189 | * | 6/1997 | Park ................................. 369/44.23 |

FOREIGN PATENT DOCUMENTS

| | | |
|---|---|---|
| 42 18 642 A1 | 12/1992 | (DE) . |
| 42 33 336 A1 | 4/1994 | (DE) . |
| 0 418 087 A2 | 3/1991 | (EP) . |
| 0014135 * | 1/1984 | (JP) . |
| 63-269325A | 11/1988 | (JP) . |
| 1-013243A | 1/1989 | (JP) . |
| 2-037536A | 2/1990 | (JP) . |
| 2-113458A | 4/1990 | (JP) . |
| 2-240849A | 9/1990 | (JP) . |
| 4-177623 * | 6/1992 | (JP) . |
| 6-068540A | 3/1994 | (JP) . |
| 6-203422A | 7/1994 | (JP) . |
| 7-176097A | 7/1995 | (JP) . |
| 7-320327A | 12/1995 | (JP) . |

* cited by examiner

RECORDING OR REPLAY DEVICE AND METHOD FOR RECOGNITION OF A FOCUSSING STATUS

BACKGROUND OF THE INVENTION a. Field of the Invention

The invention relates to a method and a device for recognition of a focussing status of a light beam incident on an information carrier.

b. Description of the Prior Art

The method according to the invention for recognition of a focussing status can be employed in a corresponding recording or replay device for contactless scanning of optical information carriers. In a recording or replay device of this type, an information carrier, for example a CD, is illuminated by a scanning light beam. A light beam reflected by the information carrier carries the information stored on the information carrier. In the case of CDs, by far the most common optical information carrier, usually elongate indentations are made on a plane reflecting face. These indentations, also referred to as pits, form a track in the form of a spiral or concentric circles. The reflected light beam has a different intensity, depending on whether the scanning light beam is incident on the CD at an indentation or at a plane location.

In order to obtain an unambiguous signal, the scanning light beam needs to be focussed very well. On the one hand, the light spot on the information carrier face carrying the information should not be too large, so that neighbouring pits or tracks are not picked up at the same time, and on the other hand the light spot should not fall short of a particular minimum size. This minimum area is necessary, for example in the case of a CD, so that, for incidence on a pit, a sufficient area around the pit is also illuminated. The pit gap conventionally used in a CD then causes a drop in intensity, due to destructive interference, in the reflected light beam.

Conventional optical scanning systems are therefore provided with an autofocus system for automatically setting or correcting the focussing of the scanning light beam. A known design for recognizing the focussing status of a light beam incident on an information carrier uses astigmatism.

Figure 6:
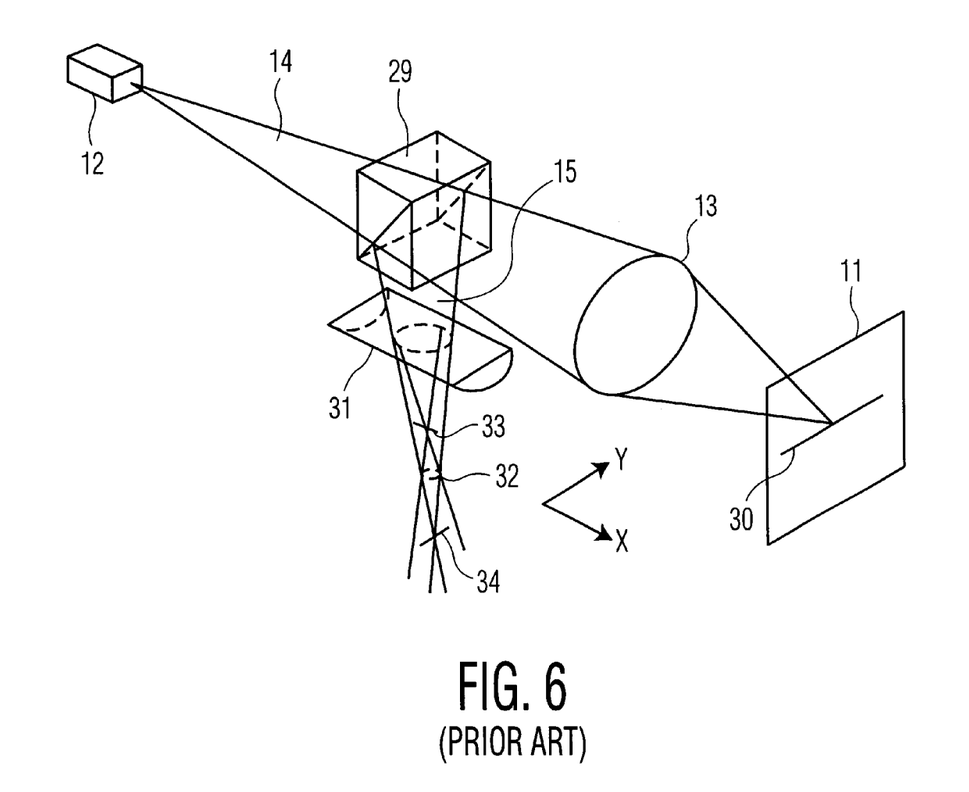
FIG. 6 shows a schematic representation of a known recording or replay device.

This design is explained with the aid of a conventional scanning system with reference to FIG. 6. In FIG. 6, a scanning light beam 14 is emitted by a light source 12, in particular a semiconductor laser. The scanning light beam 14 passes through a beam splitter 29 and is focussed using a converging lens 13 in such a way that the focus falls on the information track 30 of an information carrier 11. A light beam 15 reflected by the information carrier 11 carries the information read from the information track 30, passes again through the converging lens 13 and is reflected down onto a cylindrical lens 31 by the beam splitter 29. In the reflected light beam 15, the cylindrical lens 31 produces artificial astigmatism, so that the reflected light beam 15 is converted into an irregular light beam. This light beam does not have a cross-section with symmetry of rotation about the propagation direction. It does not have a single focal point, but has two focal lines 33, 34 which are spaced apart and one of which extends in the x direction of the cylinder axis of the cylindrical lens 31 while the other extends in the y direction perpendicular thereto.

If the information carrier 11 moves in a direction in which the distance to the converging lens 13 becomes smaller, the cross-section of the light beam at point 32 becomes broader in the x direction. If, however, the information carrier 11 is moved away from the converging lens 13, the cross-section of the reflected light beam 15 at point 32 becomes broader in the y direction. This means that the so-called astigmatism and the concomitant change in the cross-section of the reflected light beam 15 can be used as a focussing error signal, in order to control or regulate the distance from the converging lens 13 to the information carrier 11 so that the pits in the information-carrying face of the information carrier 11 always lie within the focus of the scanning light beam. The change in the cross-section of the reflected light beam at point 32 can be scanned using a light-sensitive detector 18, in particular a photodiode.

DE 40 02 015 C2 discloses a further scanning system, in which the focussing status of the light beam incident on the information carrier can be recognized. In the scanning system presented there, a prism with parallelogram-shaped configuration is used instead of the cylindrical lens.

The use of a prism is proposed in the arrangement described there in order to achieve an optical system with reduced dimensions. On the one hand, in the optical system proposed there, the beam splitter can be omitted, since the prism itself constitutes one. On the other hand, the overall arrangement is made shorter by the reflected light beam being reflected to and fro repeatedly in the prism itself.

However, in order to ensure the beam-splitting function as well as the multiple reflection of the reflected light beam, elaborate alignment of the prism is necessary.

A likewise elaborate alignment is necessary when using a cylindrical lens. Furthermore, a cylindrical lens has the disadvantage that it requires a relatively high degree of outlay on production. In order to achieve a sufficiently large focal spot, the cylindrical lens is furthermore combined with a negative lens, i.e. a diverging lens.

The object of the invention is to provide a method for recognizing a focussing status by utilizing astigmatism, in which significant astigmatism can be achieved in the reflected light beam simply and cost-efficiently without elaborate alignment. A further intention is to provide a corresponding recording or replay device.

SUMMARY OF THE INVENTION

This object is achieved in terms of the method and device described below.

One key idea of the present invention consists in that the reflected light beam is split by means of a birefringent element into an ordinary and an extraordinary fractional beam, and in that the focussing status of the scanning light beam is inferred from the cross-sectional shape of the extraordinary fractional beam. For use in the birefringence of a crystal, according to the invention significant astigmatism, or a status similar to astigmatism, can be achieved so that an accurate measure of the focussing status of the scanning light beam on the information carrier can be derived therefrom.

The birefringence effect will be explained in brief below. For further details, reference may be made, for example, to Bergmann/Schäfer, "Lehrbuch der Experimentalphysik" [Textbook of Experimental Physics], Vol. 3 "Optik" [Optics], 8th edition, pages 524 to 566. A converging light beam will be considered, which is passed through a birefringent, plane-parallel plate. To simplify the explanation, it will be assumed that the optical axis of the plane-parallel plate is parallel to its incidence and emergence faces. It will furthermore be assumed that the ordinary refractive index no is greater than the extraordinary refractive index $n_e$, that is to say that there is optically negative behaviour. The reverse case which is likewise possible will not be considered further here. For the ordinary part of the light beam, the plate is isotropic, and the usual laws of refraction are valid. For the extraordinary part, only two incidence planes for the incident light beam will be considered below, namely an incidence plane parallel to the optical axis and an incidence plane perpendicular to the optical axis. The marginal rays in the perpendicular incidence plane experience in the $n_e$ mode, that is to say in the extraordinary part, a smaller refractive index, given by the extraordinary refractive index and the angle with respect to the optical axis of the plate, than that in the parallel incidence plane. Consequently, the marginal rays in the perpendicular incidence plane, when considering the $n_e$ mode, are refracted less than the marginal rays in the parallel incidence plane. When these marginal rays of the $n_e$ mode emerge from the plate, they form a focal point which is further away than the focal point in the other plane, perpendicular thereto.

This results in a desired "blurring" of the focal point of the extraordinary fractional beam ($n_e$ mode). The extraordinary fractional beam is given an asymmetric cross-sectional shape by the birefringent element.

Additionally, or alternatively, the behaviour of the $n_e$ mode in the incidence plane perpendicular to the optical axis may also be compared with the $n_o$ mode, that is to say the ordinary part.

In the case of a recording or replay device for reading information from or writing information to an information carrier, this effect can be used to recognize a focussing status. Since the effect is very clear, it does not need such elaborate alignment as in the prior art designs. Simple alignment is furthermore accommodated by the fact that the optical axis of the crystal lies in the plane of the plate. There is therefore no need to centre the plate relative to the optical axis of the light beam, in contrast to the cylindrical lens whose optical axis coincides with the optical axis of the light beam.

It is expedient to arrange for the light beam reflected by the information carrier to be incident on the birefringent element as a converging light beam, and preferably in such a way that the respective focal points, namely both the focal point of the ordinary fractional beam and the split focal points of the extraordinary fractional beam, lie behind the birefringent element. Since the relative position of the focal points of the ordinary and extraordinary fractional beams varies with a change in the focussing status of the scanning light beam, a possible focussing error can be inferred from their relative position or the asymmetry in the cross-section of the extraordinary fractional beam.

Expediently, a detector, in particular a photo-sensitive element, is provided which registers the shift in the relative position of the focal points of the ordinary and extraordinary fractional beams or the change in the cross-sectional shape of the extraordinary fractional beam.

In the case of a recording or replay device for reading information from or writing information to an information carrier, a key idea consists in providing a birefringent element which produces artificial astigmatism, or a status similar to astigmatism, in the light beam reflected by the information carrier. The light beam is in this case separated into an ordinary and an extraordinary fractional beam which is refracted to a different extent depending on the position of the optical axis of the birefringent element.

Since there is no birefringence in the direction of the optical axis of the birefringent element, the birefringent element is preferably arranged in such a way that its optical axis makes, with the incidence direction of the light beam, an angle $\alpha > 0°$, preferably an angle $\alpha$ of from 45° to 90°, in particular of a $\alpha = 90°$. The specified values for $\alpha$ allow the use of the astigmatism of the birefringent element to be optimized as far as possible.

In a particular expedient and cost-efficient variant, the birefringent element is formed by a plane-parallel plate which consists of a uniformly birefringent element.

However, as an alternative, the birefringent element may also be formed by a so-called Wollaston prism. A Wollaston prism of this type consists of two right-angled prisms cemented at their base faces, the optical axes of the respective prisms not being aligned parallel to one another. A Wollaston prism whose optical axes are perpendicular to one another is suitable for producing astigmatism. It is relatively easy to produce, but because of the wedge shape of the two halves of such a Wollaston prism, the beam of rays may become deformed. This can be avoided if a Wollaston prism having optical axes arranged tilted by 45° relative to one another is used.

A particularly high degree of separation between the two light beams can be achieved with a Wollaston prism of this type. Furthermore, because of its plane-parallel faces, a prism of this type is straightforward to mount.

In the Wollaston prism, the wedge angle $\gamma$ between the two prisms should be from 5° to 30°, preferably 10° to 20°, in particular about 15°. With a wedge angle of 15°, highly satisfactory results were obtained in practical trials. Both the overall size and the separation of the images depend on the wedge angle and are particularly favourable in the specified range.

The splitting between ordinary and extraordinary fractional beams can be further amplified by fitting a plurality of birefringent elements one after the other, in particular a Wollaston prism and a plane-parallel plate. If appropriate, the properties of one element which are unfavourable in this case can be compensated for or at least minimized by suitably configuring the other element.

The recording or replay device according to the invention is, in particular, suitable for carrying out the method according to the method claims.

BRIEF DESCRIPTION OF THE DRAWINGS

The invention will also be explained below with regard to further features and advantages with the aid of the description of illustrative embodiments and with reference to the appended drawings. It is to be understood that the invention is not restricted just to the illustrative embodiments.

DETAILED DESCRIPTION OF THE INVENTION

Figure 1:
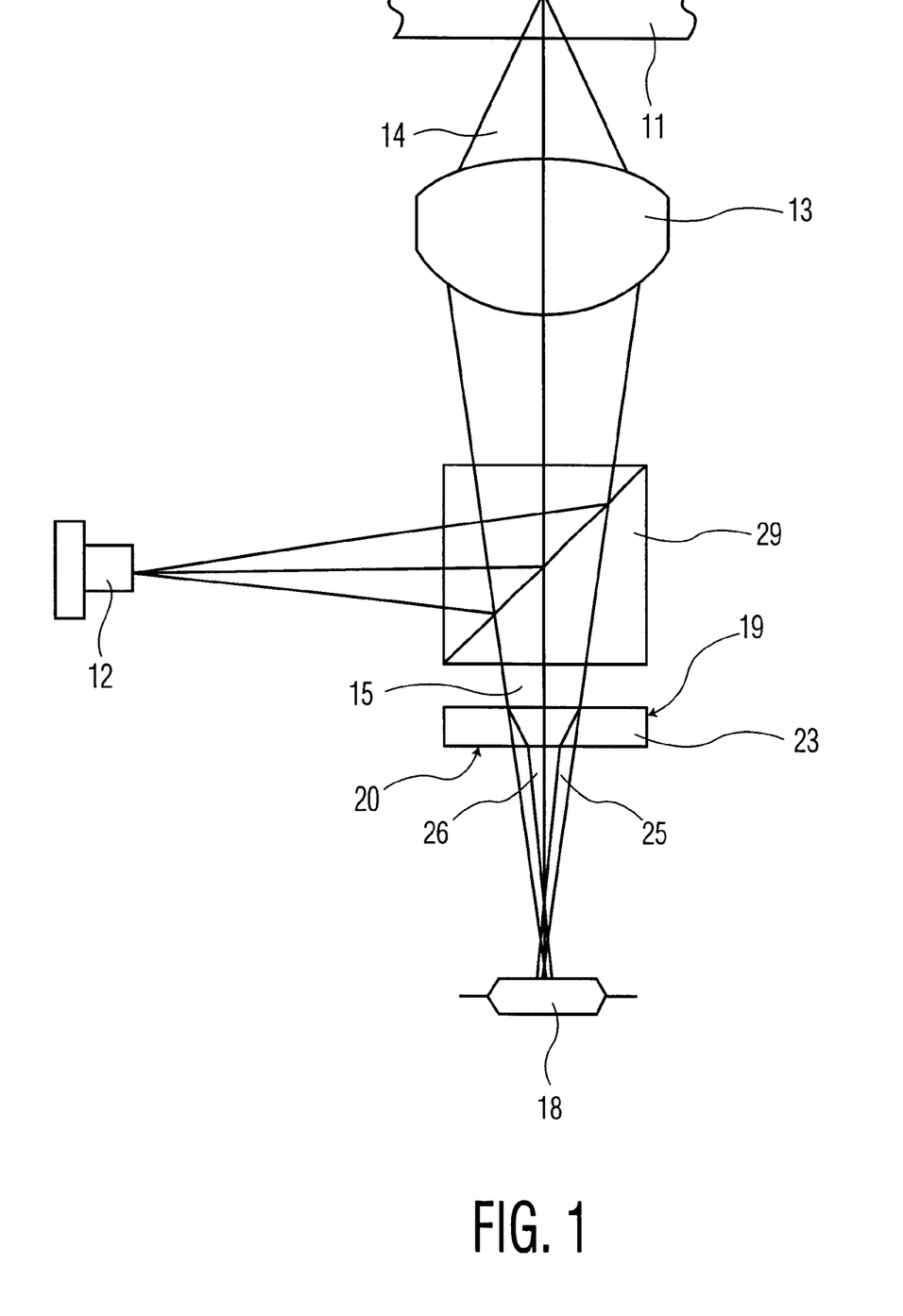
FIG. 1 shows a schematic representation of an embodiment of the recording or replay device according to the invention.

FIG. 1 schematically represents an embodiment of he recording or replay device according to the invention. or simplicity, for components which are the same or correspond to one another in the embodiment which is shown, the same reference numbers as in the explanation of the conventional recording or replay device are used. The recording or replay device according to FIG. 1 has a light source, in particular a semiconductor laser 12. The semiconductor laser 12 emits a scanning light beam 14 which is incident on a beam splitter 29 and from there is reflected onto a converging lens 13. In the converging lens 13, the scanning light beam 14 is focussed in such a way that the tightly localized focus is formed on an information carrier 11 so that information can be read or written.

The scanning light beam 14 is aligned in such a way that its incidence on the information carrier 11 is normal. The light beam 14 reflected by the information carrier 11 therefore passes again through the converging lens 13. A part of the reflected light passes through the beam splitter 29 without deviation. In the simplest embodiment, the beam splitter 29 can be formed by a semisilvered mirror. The reflected light beam 15, which converges after passing through the converging lens 13, is subsequently incident on a birefringent optical element, which is here formed by a plane-parallel plate 23. In the plane-parallel plate 23, the reflected light beam 15 is split into an ordinary fractional beam 25 and an extraordinary fractional beam 26. This splitting is indicated in FIG. 1 only for the purpose of illustration. It depends on the position of the optical axis of the birefringent element and is not at all to scale in FIG. 1.

After passing through the plane-parallel plate 23, the ordinary and extraordinary fractional beams 25, 26 are incident on a detector 18 which may be formed by a photosensitive element, for example a photodiode divided into a plurality of sectors. For the purpose of evaluation, the extraordinary fractional beam 26 is sufficient. The ordinary fractional beam 25 does not, however, especially need to be stopped out, but can be incident on the detector 18 together with the extraordinary fractional beam 26. The ordinary fractional beam has symmetry of rotation about the optical axis of the light beam and does not therefore interfere with the formation of the focussing error signal. Since it is incident on the detector in addition to the extraordinary fractional beam, it can be used together with it to form the information signal.

In this embodiment, the plane-parallel plate 23 is formed by a uniform, homogeneous material. Suitable examples of a birefringent material include calcite, quartz or $LiNbO_3$, it being desirable to have the largest possible difference between the ordinary refractive index $n_o$ and the extraordinary refractive index $n_e$ at the relevant wavelength of the semiconductor laser.

Figure 2A:
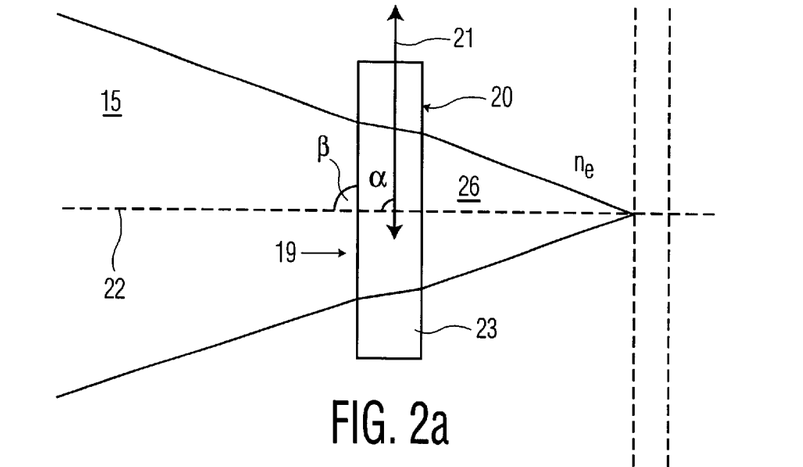
FIG. 2a shows an illustrative representation of the extraordinary refraction at a plane-parallel plate in an incidence plane parallel to the optical axis.
Figure 2B:
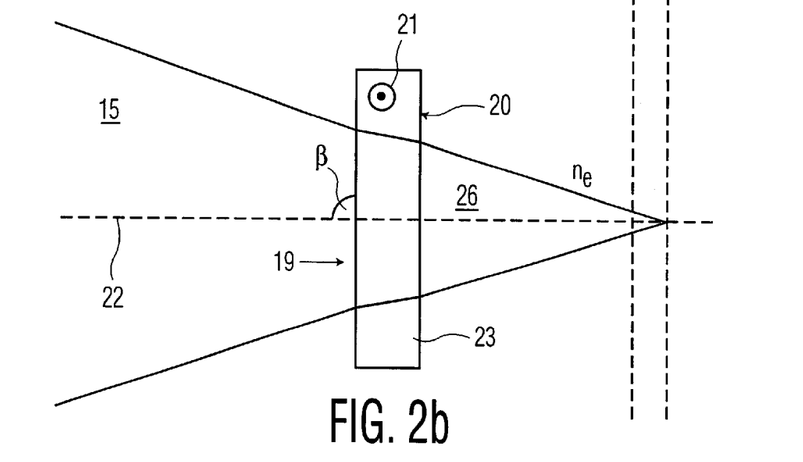
FIG. 2b shows an illustrative representation of the extraordinary refraction at a plane-parallel plate in an incidence plane perpendicular to the optical axis.

In FIG. 2a and FIG. 2b, the extraordinary refraction at a plane-parallel plate 23 consisting of birefringent material is represented by way of illustration, FIG. 2a showing the marginal rays of the refracted light beam 15 in an incidence plane parallel to the optical axis of the birefringent material, and FIG. 2b showing the marginal rays of the reflected light beam 15 in an incidence plane perpendicular to the optical axis 21 of the birefringent material.

The reference number 22 denotes the incidence direction, onto the plane-parallel plate 23, of the light beam 15 reflected by the information carrier 11. When it is incident on the plane-parallel plate 23, the reflected light beam 15 is, as already explained, split into an ordinary fractional beam 25 and an extraordinary fractional beam 26. For reasons of clarity, only the marginal rays of the extraordinary fractional beam 26 are represented in FIGS. 2a and 2b. The ordinary fractional beam 25 follows a normal refraction behaviour, in which there is no recognizable privileged direction.

In FIGS. 2a and 2b, a plane-parallel plate 23 having optically positive behaviour is assumed, that is to say the extraordinary refractive index $n_e$ is greater than the ordinary refractive index $n_o$. This results in the extraordinary part of the light beam 15 being refracted to a greater extent than the ordinary part. The degree of refraction of the extraordinary part also depends on the angle between the incidence plane and the optical axis. Thus, for an incidence plane perpendicular to the optical axis 21 (FIG. 2b), the extraordindary part is refracted by the plane-parallel plate 23 to a greater extent than the ray incident in the incidence plane perpendicular thereto. In the incidence plane parallel to the optical axis 21, the marginal rays of the reflected light beam 15 are refracted less strongly, so that the focal point in this plane (FIG. 2a) is at a lesser distance than in the plane perpendicular to the optical axis 21 (FIG. 2b). It is thus possible, by means of the plane-parallel plate 23 consisting of birefringent material, to produce astigmatism in the extraordinary part of a light beam 15 which is convergent on incidence, this astigmatism being suitable for detecting a focussing error signal of a device for reading from and/or writing to optical recording media. Suitable sensors and evaluation methods for the astigmatism-focussing method are widely known and are therefore not described in further detail here.

Figure 3:
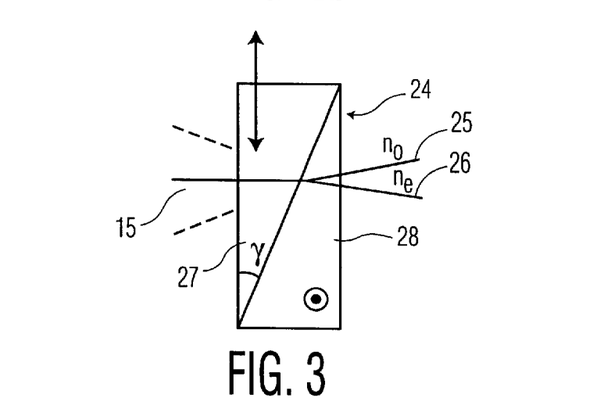
FIG. 3 shows an illustrative representation of a Wollaston prism.

FIG. 3 represents a Wollaston prism 24 for the purpose of illustration. The Wollaston prism 24 consists of two right-angled prisms 27, 28 cemented via their base faces. It is also possible here to use prisms which are not right-angled, but have mutually parallel plane faces. In prism 27, the optical axis is parallel to the plane of the paper, whereas in prism 28, the optical axis is arranged perpendicular to the plane of the paper. With this prism arrangement, a high spatial separation of the ordinary fractional beam 25 and the extraordinary fractional beam 26 can be achieved, these being indicated here only by the path of the central ray of the light beam 15. It should be noted that the terms "ordinary" and "extraordinary" are only relative because of the optical properties of the Wollaston prism, since one fractional beam is the optically ordinary fractional ray only for half of the Wollaston prism, and is the optically extraordinary fractional ray for the other half. The same is true in reverse for the other fractional beam.

Figure 4A:
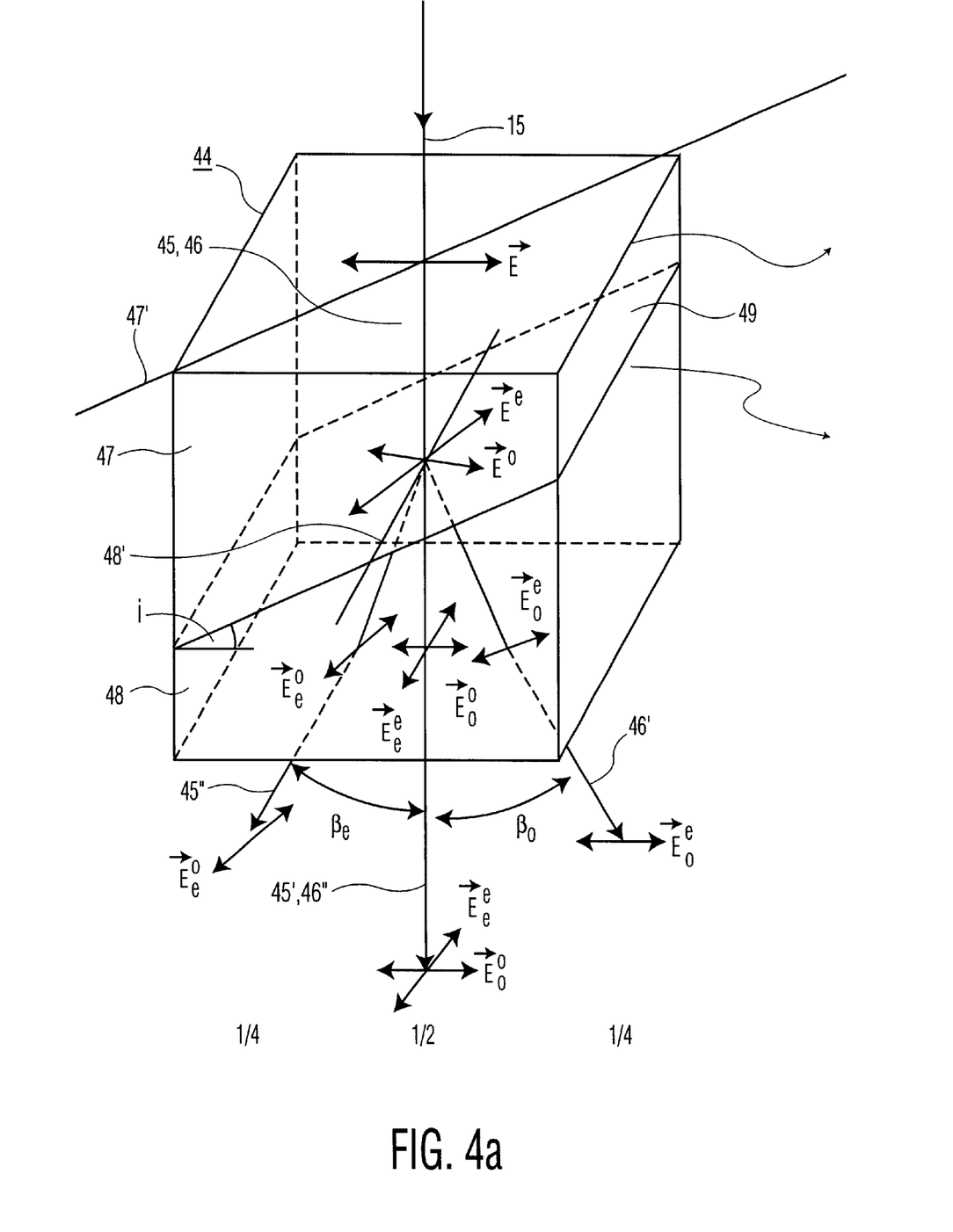
FIG. 4 shows an illustrative representation of a further Wollaston prism.

FIG. 4a represents a further Wollaston prism 44 which consists of two prisms 47 and 48 which are cemented to one another and whose optical axes 47' and 48' are directed at an angle of 45° with respect to one another. The wedge angle of the prisms is denoted by i. A prism of this type is also referred to as a three-ray Wollaston prism.

Figure 4B:
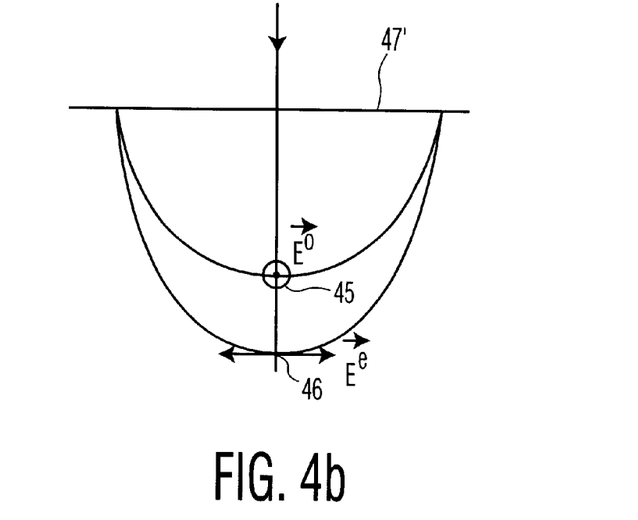

The polarization direction of the incident light beam 15 is marked $\vec{E}$ and is rotated by 45° with respect to the optical axis 47'. Since the ray 15 has normal incidence on the surface of the Wollaston prism 44, the ordinary ray 45 and the extraordinary ray 46 propagate in this direction, albeit at a different speed. The respective polarization directions are specified in the figure, at the interface 49 between the prisms 47, 48, by $\vec{E}^o$ for the ordinary fractional beam 45 and by $\vec{E}^e$ for the extraordinary fractional beam 46. The different propagation behaviour is illustrated in FIG. 4b.

Figure 4C:
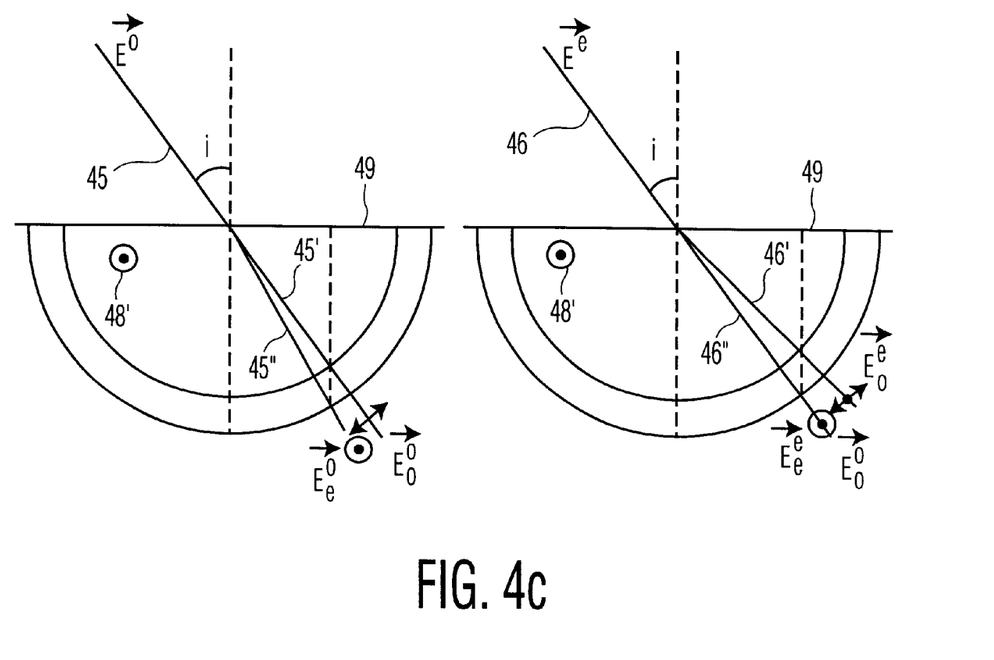

FIG. 4c shows, on the left, the splitting of the ordinary fractional ray 45, marked as $\vec{E}^o$, and on the right the splitting of the extraordinary fractional ray 46, marked as $\vec{E}^e$, on passing from prism 47 to prism 48. The direction of the optical axis of the crystal is again denoted by 48'. The fractional ray 45 is split into an ordinary fractional ray 45', the polarization direction of which is marked as $\vec{E}^o{}_o$, and an extraordinary fractional ray 45", the polarization direction of which is marked as $\vec{E}^o{}_e$. The nomenclature is in this case chosen in such a way that the upper index indicates whether the fractional ray was ordinary or extraordinary in the first prism 47 through which it passed, and the lower index indicates the corresponding property in the second prism 48 through which it passed. The ordinary fractional ray 45' propagates in the incidence direction, whereas the extraordinary ray 45" is deviated from this direction.

The right-hand part of FIG. 4c shows how the fractional ray 46 is split into an ordinary fractional ray 46', the polarization direction of which is marked as $\vec{E}^e{}_o$, and an extraordinary fractional ray 46", the polarization direction of which is marked as $\vec{E}^e{}_e$. The ordinary fractional ray 46' is deviated from the incidence direction, whereas the extraordinary ray 46" propagates further in the incidence direction.

In the prism 48, there are therefore four different fractional rays 45', 45", 46' and 46", of which the fractional rays 45' and 46" coincide and propagate in the direction of the incident ray 15. Since this combined ray consists of two fractional rays polarized at right angles to one another, there is here again a possibility of producing astigmatism by means of a birefringent lens.

Figure 5:
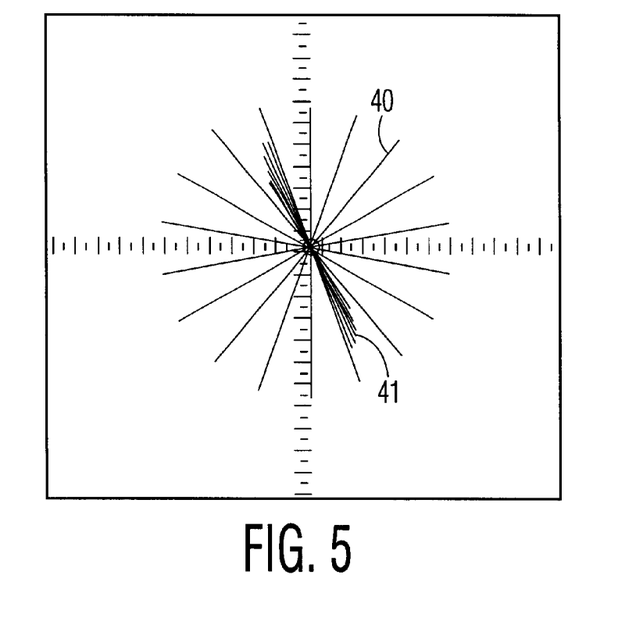
FIG. 5 shows a representation of the light received at a detector when using a Wollaston prism according to FIG. 4 in the recording or replay device according to the invention.

FIG. 5 represents the zeroth-order ray distribution, that is to say that of the ray consisting of the fractional rays 45' and 46", after passing through the Wollaston prism 44, as was confirmed for a system according to the invention. In the case in FIG. 5, the Wollaston prism 44 has a thickness of 1 mm and a wedge angle i of 15°. The ordinary refractive index $n_o$ is 2.2585. The extraordinary refractive index $n_e$ is 2.1765. A wavelength of 780 nm and a focal length of 17.03 mm were employed. The essentially point-symmetrical distribution 40 is due to the ordinary fractional ray 45', whereas the asymmetric distribution 41 is due to the extraordinary fractional ray 46".

With the method according to the invention and the corresponding recording or replay device, it is possible to produce on the detector a focal spot which depends with extraordinary sensitivity on the focussing status of the scanning light beam on the information carrier. Alignment can be carried out substantially more easily and the outlay on production is reduced overall.

What is claimed is:

1. A recording or replay device for reading from or writing to optical information carrier, the device comprising:
   a light source that illuminates the information carrier with a scanning light beam; and
   means for producing artificial astigmatism in a light beam reflected by the information carrier, the producing means; comprising a birefringent element having two parallel faces, arranged opposite each other, which respectively define an entry face and an exit face, the birefringent element generating, from the reflected beam entering the entry face of the birefringment element an ordinary beam, having a first polarization and an extra ordinary beam having a second polarization, wherein both beams exit through the exit face of the birefringent element, and the birefringent element induces astigmatism only in the extraordinary beam passing therethrough.

2. Recording or replay device according to claim 1, wherein the birefringent element is formed by a plane-parallel plate which consists of a uniformly birefringent material.

3. Recording or replay device according to claim 1, farther comprising a detector, on which the light beam is incident after the light beam has passed through the birefringment element and which scans the focussing status of the scanning light beam on the information carrier via the astigmatism or the change in the cross-section of the extraordinary beam.

4. Recording or replay device according to claim 1, further comprising a focussing device which focuses the fight beam reflected by the information carrier in such a way that the reflected light is incident on the birefringment element as a converging light beam.

5. Recording or lay device according to claim 1, wherein a focussing device is disposed been the light source and the information carrier, the distance between the focussing device and the information carrier being adjustable for focussing the scanning light beam on the information carrier, and in that a detector delivers a signal that is fed to a control or regulating device which controls or regulates the distance from the focussing device to the information carrier.

6. Recording or replay device according to claim 1, wherein the birefringment element is arranged in such a way that the incidence direction of the incident light beam forms an angle β about 90°, with the incidence face of the birefringent element.

* * * * *